US012348529B2

(12) United States Patent
Rungta et al.

(10) Patent No.: US 12,348,529 B2
(45) Date of Patent: Jul. 1, 2025

(54) AUTOMATED POLICY REFINER FOR CLOUD-BASED IDENTITY AND ACCESS MANAGEMENT SYSTEMS

(71) Applicant: Amazon Technologies, Inc., Seattle, WA (US)

(72) Inventors: Neha Rungta, Seattle, WA (US); Chungha Sung, Seattle, WA (US); Amit Goel, Seattle, WA (US); Zvonimir Rakamaric, Seattle, WA (US); Loris D'Antoni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 17/957,904

(22) Filed: Sep. 30, 2022

(65) Prior Publication Data
US 2024/0114035 A1    Apr. 4, 2024

(51) Int. Cl.
*H04L 9/40*    (2022.01)

(52) U.S. Cl.
CPC .......... *H04L 63/107* (2013.01); *H04L 63/102* (2013.01)

(58) Field of Classification Search
CPC .............................. H04L 63/107; H04L 63/102
See application file for complete search history.

(56) References Cited

U.S. PATENT DOCUMENTS

| | | | | |
|---|---|---|---|---|
| 10,148,701 | B1* | 12/2018 | Hecht | G06F 9/455 |
| 10,158,670 | B1* | 12/2018 | Roth | H04L 63/102 |
| 10,749,910 | B1* | 8/2020 | Balber | H04L 63/205 |
| 10,922,423 | B1* | 2/2021 | Rungta | G06F 21/604 |
| 2014/0222866 | A1* | 8/2014 | Joneja | G06F 21/6218 |
| | | | | 707/827 |
| 2020/0336489 | A1* | 10/2020 | Wuest | G06F 21/45 |

(Continued)

FOREIGN PATENT DOCUMENTS

EP    3567506 A1    11/2019

OTHER PUBLICATIONS

International Search Report and Written Opinion, PCT App. No. PCT/US2023/073986, Jan. 8, 2024, 13 pages.

*Primary Examiner* — Michael W Chao
*Assistant Examiner* — Raghavender Cholleti
(74) *Attorney, Agent, or Firm* — Nicholson De Vos Webster & Elliott LLP

(57) ABSTRACT

Techniques are described for providing a policy refiner application used to analyze and recommend modifications to identity and access management policies created by users of a cloud provider network (e.g., to move the policies toward least-privilege permissions). A policy refiner application receives as input a policy to analyze, and a log of events related to activity associated with one or more accounts of a cloud provider network. The policy refiner application can identify, from the log of events, actions that were permitted based on particular statements contained in the policy. Based on field values contained in the corresponding events, the policy refiner application generates an abstraction of the field values, where the abstraction of the field values may represent a more restrictive version of the field from a policy perspective. These abstractions can be presented to users as recommendations for modifying their policy to reduce the privileges granted by the policy.

20 Claims, 8 Drawing Sheets

(56) References Cited

U.S. PATENT DOCUMENTS

| | | | |
|---|---|---|---|
| 2020/0366707 A1* | 11/2020 | Cook | H04L 9/40 |
| 2021/0281610 A1* | 9/2021 | Applegate-Swanson | H04L 63/20 |
| 2021/0406720 A1* | 12/2021 | Song | H04L 63/0227 |
| 2022/0191206 A1* | 6/2022 | Cook | H04L 41/0627 |
| 2024/0179188 A1* | 5/2024 | Torlak | H04L 63/104 |

* cited by examiner

AUTOMATED POLICY REFINER FOR CLOUD-BASED IDENTITY AND ACCESS MANAGEMENT SYSTEMS

BACKGROUND

Cloud provider networks enable users to use a variety of computing-related resources such as compute resources, storage resources, networking resources, and the like. When a user or application interacts with a cloud provider network (e.g., using an application programming interface (API), command line interface (CLI), or web-based console provided by the cloud provider network), the user or application typically is required to provide security credentials used by the cloud provider to authenticate the user or application and to determine whether the user or application has permission to access the requested resources or actions. The security credentials can include, for example, usernames and passwords, access keys, and the like.

BRIEF DESCRIPTION OF DRAWINGS

Various examples in accordance with the present disclosure will be described with reference to the drawings, in which.

DETAILED DESCRIPTION

Figure 1:
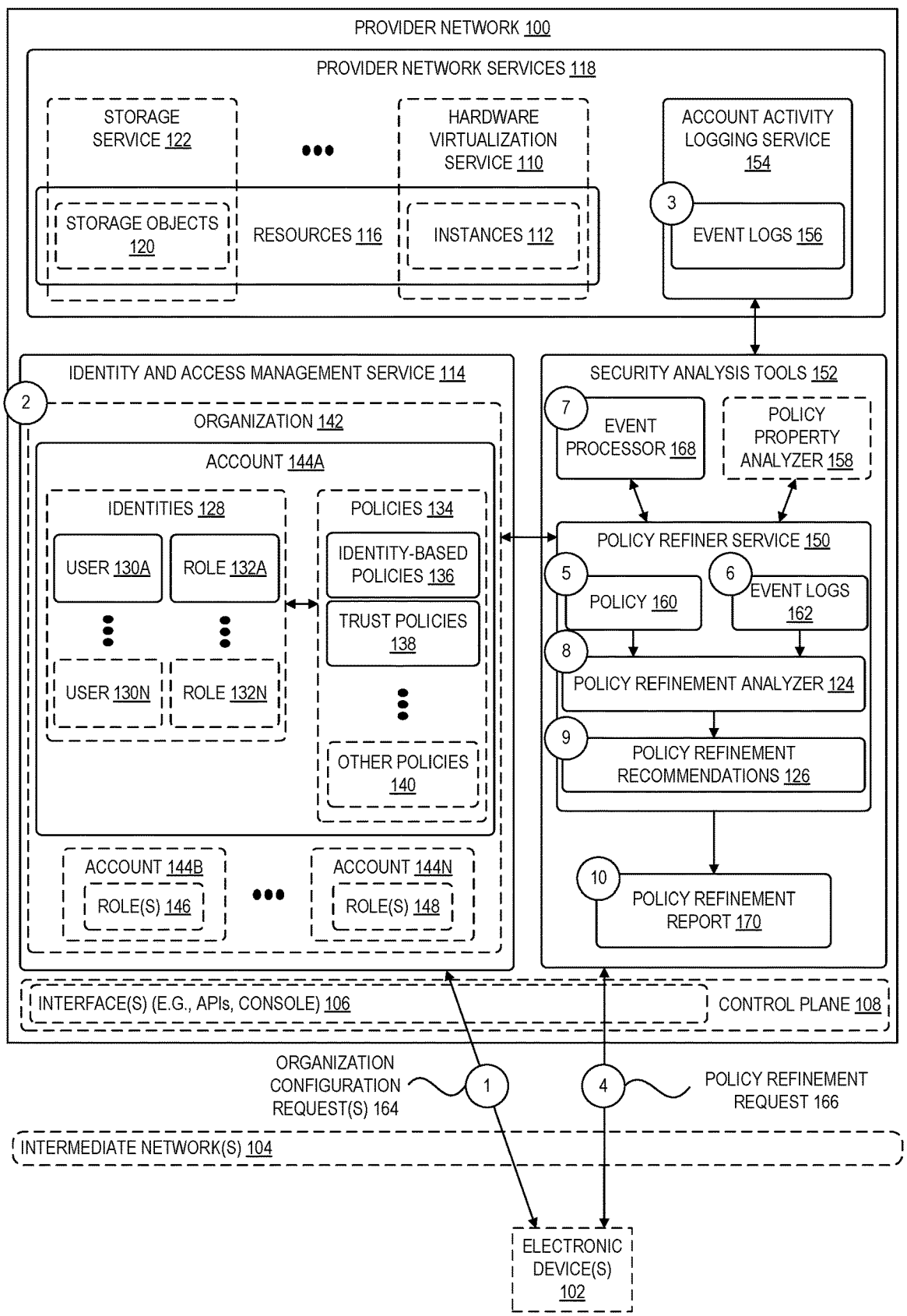
FIG. 1 is a diagram illustrating an environment including a policy refiner application used to analyze and recommend modifications to identity and access management policies created by users of a cloud provider network to reduce permissions granted by the policies according to some examples.

The present disclosure relates to methods, apparatus, systems, and non-transitory computer-readable storage media for a policy refiner application used to analyze and recommend modifications to identity and access management policies created by users of a cloud provider network to reduce permissions granted by the policies (e.g., to move the policies toward least-privilege permissions). According to some examples, a policy refiner application (implemented, e.g., as a standalone software application, web-based service, or the like) receives as input a policy to analyze, and a log of events related to activity associated with one or more accounts of a cloud provider network (e.g., as generated by an account activity logging service). The policy refiner application can identify, from the log of events, actions that were permitted based on particular statements contained in the policy. Based on field values contained in the corresponding events, the policy refiner application generates an abstraction of the field values, where the abstraction of the field values may represent a more restrictive version of the field from a policy perspective (e.g., because it restricts the associated policy statement to fewer actions, to a smaller range of IP addresses, etc.). In some examples, these abstractions can be presented to users as recommendations for modifying their policy to reduce the privileges granted by the policy.

Cloud provider networks typically include services and tools that enable users to securely control access to their resources (an object provided by a service of the cloud provider network such as, e.g., a compute instance, a storage resource, a user or a role, etc.). These services and tools, for example, broadly allow users to control who is authenticated (i.e., signed in) and authorized (i.e., has permissions) to access and use certain resources. Users can manage access management by creating policies and attaching those policies to identities (users, groups of users, or roles) or to resources (e.g., storage resources, compute resources, etc.) As a best practice, it is often advised that users grant only the permissions required to perform the tasks desired by the users in control of a set of accounts.

Administrators and developers sometimes nevertheless grant permissions to entities (users or roles) beyond what those entities require to perform the operations expected of those entities. In some examples, a cloud provider provides tools that can be used to automatically create a policy that is based on logged access activity for one or more entities. For example, some tools can generate a policy template containing the permissions that the entity used in a specified date range. A user can then use the template to create a policy with more fine-grained permissions that grant only the permissions that are required to support a specific use case. An assumption with such tools is that actual user access to resources over time can be more indicative of what permissions should be granted. However, administrators and developers can also benefit from an ongoing review of existing policies for opportunities to refine the permissions contained therein and currently users do not have access to automated ways to perform such analyses.

These challenges, among others, are addressed by the described policy refiner application enabling users to refine the permissions contained in a policy based on an analysis of event logs reflecting access activity for one or more associated entities. In some examples, the policy refiner application generalizes information contained in the event logs into predicates that can be used as field values in one or more policies under analysis. As indicated, these recommended modifications to a policy generated by the policy refiner application can be displayed to users in a graphical user interface (GUI), enabling users to review the recommendations and to readily implement recommended modifications to policy as desired. Among other benefits, the use of the policy refiner application enables users to more efficiently arrive at least-privilege policies based on account activity over time, thereby improving the security and fault tolerance of users' cloud-based entities and resources.

FIG. 1 is a diagram illustrating an environment including a policy refiner application used to analyze and recommend modifications to identity and access management policies created by users of a cloud provider network to reduce permissions granted by the policies according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 104 (e.g., the internet) via one or more interface(s) 106, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 106 can be part of, or serve as a front-end to, a control plane 108 of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network 100 via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide can be referred to as a "managed compute service," where a managed compute service executes code or provides computing resources for its users in a managed configuration. Examples of managed compute services include, for example, an on-demand code execution service, a hardware virtualization service 110, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service 110 (referred to in various implementations as an elastic compute service, a virtual machines service, a computing cloud service, a compute engine, or a cloud compute service) can enable users of the provider network 100 to provision and manage compute resources such as virtual machine instances 112. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some examples, an identity and access management service 114 is a service that enables users to securely control access to cloud provider network resources (e.g., resources 116 associated with various provider network services 118, such as storage objects 120 associated with a storage service 122, databases associated with a database service, compute instances 112 associated with a hardware virtualization service 110, and the like). The identity and access management service 114 is broadly used to control who is permitted to authenticate (e.g., sign in) with the cloud provider network 100 and who is authorized (e.g., has permissions) to use resources provided by the cloud provider network. In general, a resource is a concept used to capture the domain of items that can be created, read, modified, or deleted by customers in a cloud provider network 100. Examples of resources also include identities (e.g., identities 128, including example users 130A, . . . , 130N and roles 132A, . . . , 132N) and policies 134 (e.g., including identity-based policies 136, trust policies 138, and other policies 140). FIG. 1 further illustrates the concept of an organization 142, which can include any number of associated accounts 144A, 144B, . . . , 144N, which can further include any number of users and roles (e.g., role(s) 146 associated with account 144B and role(s) 148 associated with account 144N).

When a person initially creates an account with the cloud provider network 100, the person may typically begin with a single sign-in identity that has complete access to all cloud provider network services and resources associated with the account (e.g., a root user of identities 128). For example, the root user identity may be accessed by signing in with a username (e.g., an email address) and a password used to create the account. Cloud provider networks 100 often advise users to avoid using a root user for most tasks and instead to create additional user accounts with defined permissions (e.g., such as one or more of users 130A, ..., 130N). A user can then optionally grant different permissions to different user accounts for different resources. For example, a user account might be configured to allow some users complete access to a hardware virtualization service 110, a storage service 122, and other cloud provider network 100 resources. Other user accounts might be allowed read-only access to some storage buckets, or permission to administer some instances 112, etc.

In some examples, a principal represents a person or application that can make a request for an action or operation on a resource of the cloud provider network 100 (e.g., a resource 116 or a resource of the identity and access management service 114) via one or more identities. The set of identities 128 associated with an account 144A can include any number of users 130A, ..., 130N and roles 132A, ..., 132N. A cloud provider network request occurs when a principal uses an identity (e.g., a user or a role) to send a request for an action or operation on a resource. A request can include some or all of the following information: the action or operations that the principal wants to perform, the resource object upon which the actions or operations are performed, the person or application that used an identity (e.g., a user or role) to send the request, environment data (e.g., information about the IP address, user agent, SSL enabled status, time of day, etc.), and resource data (e.g., data related to the resource that is being requested, such as a resource identifier, or a tag name). In some embodiments, the identity and access management service 114 gathers the information contained in a request into a request context, which is used to evaluate and authorize the request.

For a request to be completed, in some examples, the identity and access management service 114 determines whether the requesting principal is authorized (e.g., permitted) to complete the request. During authorization, the identity and access management service 114 uses values included in the request context to check for policies that apply to the request (e.g., one or more of policies 134). The identity and access management service 114 uses the policies 134 to determine whether to allow or deny the request. In some examples, the policies are stored by the identity and access management service 114 as JavaScript Object Notation (JSON) documents (or using any other data format) and specify the permissions for particular identities. There can be one or multiple types of policies 134 that can affect whether a request is authorized including, e.g., identity-based policies 136, trust policies 138, along with other possible policies 140. For example, to provide users with permissions to access resources in their own account, identity-based policies can be configured, while resource-based policies may be used for granting cross-account access to resources. In general, the identity and access management service 114 checks each policy that is applicable to the context of a request. If a single policy includes a denied action, the identity and access management service 114 denies the entire request. In some examples, an identity and access management service 114 denies requests by default, such that a request is authorized only if every part of a request is allowed by applicable permissions policies.

Once a request is authenticated and authorized, the identity and access management service 114 approves the actions or operations in the request. Operations are defined by a service (e.g., by the storage service 122, hardware virtualization service 110, identity and access management service 114, etc.) and include actions that can be performed on or relative to a resource, such as viewing, creating, editing, and deleting that resource. For example, the identity and access management service 114 may support actions such as CreateUser, DeleteUser, CreateRole, and AssumeRole, among many other possible actions. To allow a principal to perform an operation, the action is included in a policy that applies to the principal or the affected resource.

In some examples, identity-based policies 136 represent policies that are attached to an identity, such as a user, group, or role in an account. Resource-based policies represent policies that are attached to a resource such as a storage object 120, an instance 112, a role trust policy, etc. A resource-based policy, for example, controls what actions a specified principal can perform on that resource and under what conditions. In some examples, the identity and access management service 114 supports trust policies 138, which can be attached to a role (e.g., one or more of roles 132A, ..., 132N). Because a role is both an identity and a resource that supports resource-based policies, both a trust policy and an identity-based policy can be attached to a role. Trust policies 138 define which principal entities (accounts, users, roles, and federated users) can assume the role.

In some examples, at circle "1" in FIG. 1, one or more users use electronic device(s) 102 to generate organization configuration request(s) 164 to configure a set of accounts, identities, policies, etc., optionally associated with an organization (e.g., an organization 142) and to further configure policies 134 associated with some or all those resources. These identities, for example, may be created to provide authentication for users and processes within accounts (e.g., accounts 144A, ..., 144N) of the cloud provider network 100. As indicated above, identities represent a principal and can be authenticated and then authorized to perform actions in the cloud provider network 100 and each identity can be associated with one or more policies 134 to determine what actions a user or role can do with which cloud provider network resources and under what conditions. The collection of accounts, identities, and policies may be created, for example, by an organization that intends to use various services of the cloud provider network 100 for various purposes. Furthermore, the collection of accounts, principals, and policies comprising an organization may be modified over time as desired by the organization.

In some embodiments, at circle "2," responsive to the organization configuration request(s) 164, the identity and access management service 114 creates and stores data representing the accounts, identities, and policies. As indicated herein, these identities and policies can be added, edited, and removed by external users of the cloud provider network 100 with sufficient privileges, e.g., using a web-based console, API, CLI, or other interface provided by the identity and access management service 114, and data representing the principals and policies can be stored using various types of storage resources managed by the identity and access management service 114. Various principals can then use the created user(s) and role(s) to perform actions in relation to services provided by the provider network 100 including, e.g., creating and launching resources, modifying resources, deleting or termination resources, etc., over time as desired.

In some examples, at circle "3," an account activity logging service 154 generates event logs 156 reflecting user activity in a cloud provider network 100. An account activity logging service 154, for example, can enable the auditing, security monitoring, and operational troubleshooting. In some examples, the events included in event logs 156 contain information about activity associated with users' accounts such as, e.g., identifiers of users/roles making requests, the services used, the actions performed, the parameters for the actions, and the response elements returned by the applicable service. In some examples, the event logs can be stored by the account activity logging service 154 in users' storage objects 120 provided by a storage service 122, or in any other storage location accessible to users desiring the view the logs. In some examples, the account activity logging service 154 can also log data events, which provide insights into the resource (e.g., "data plane") operations performed on or within the resource itself.

In some embodiments, at circle "4," the policy refiner service 150 receives a policy refinement request 166 to analyze one or more policies for possible modifications to make the policy or policies more restrictive. The request 166 can be generated by a user using a web-based console, API, CLI, or any other interface in which a user can identify one or more policies to analyze (e.g., one or more of policies 134). As shown, the policy refiner service 150 can be part of a broader suite of security analysis tools 152 provided by the cloud provider network 100, where other tools can include a policy property analyzer 158 among many other possible tools.

In some examples, policy property analyzer 158 implements software used to translate policies into a mathematical language and then use automated reasoning tools to check properties of the policies. The tools used by a policy property analyzer 158 can include automated reasoners called Satisfiability Modulo Theories (SMT) solvers, which use a mix of numbers, strings, regular expressions, dates, and IP addresses to prove and disprove logical formulas. With these tools, the policy property analyzer 158 can compare a given policy A against a "probe" policy (or more generally another policy) to determine whether policy A is more permissive than the probe policy (and optionally to identify actions permitted by one policy but not the other). For example, to determine whether an identity A is permitted to delete a resource B, the policy analyzer 158 can be used to compare a policy associated with identity A against a probe policy that does permit deleting the resource B. In this example, the policy property analyzer 158 can provide an indication of whether the policy associated with identity A is more permissive than the probe policy. In the context of the policy refiner service 150, the policy property analyzer 158 can be used to determine whether suggested refinements to a policy generated as described herein indeed cause the policy to be more restrictive than without the suggested refinements (e.g., to ensure that the suggested modifications are moving the policy towards least privileges) and to identify actions permitted by an unmodified policy but are not permitted by a policy with one more modifications implemented.

In some examples, the policy refinement request 166 can include an identifier of one or more policies to be analyzed (e.g., one or more of policies 134, which can include an organization-wide policy such as a service control policy) and event logs to use as part of the analysis (e.g., from event logs 156 generated by an account activity logging service 154). A user can provide an identifier of a storage location of the one or more policies and event logs within the provider network 100, upload a copy of the one or more policies and event logs, or otherwise provide the information contained therein to the policy refiner service 150. In some examples, the policy refinement request 166 can include an indication of a time period within the event logs 156 to use for analysis (e.g., only the last 30 days, last 60 days, last 90 days, etc.), one or more particular accounts or roles of interest, one or more services of the cloud provider network 100 for which action requests are of interest, etc., to optionally limit the scope of the analysis. Based on the policy refinement request 166 and any optional parameters provided by a user, the policy refiner service 150 can, at circle "5," obtain a policy 160 (or optionally multiple policies) and, at circle "6," obtain event logs 162 from the event logs 156 to be used in the requested analysis.

In some examples, at circle "7," the policy refiner service 150 uses an event processor 168 to process events from event logs 162 to extract information relevant to the refinement analysis to be performed by a policy refinement analyzer 124. At a high level, the event processor 168 is used to parse events from the event logs 162 and to create a mapping between individual events and one or more statements from a policy 160 that caused the identity and access management service 114 to permit the requests represented by the events. For example, if an event from the event logs 162 describes an action in which a user account from organization 142 launched a compute instance 112, the event processor 168 can identify one or more statements from the policy 160 that caused the identity and access management service 114 to permit the request.

Figure 2:
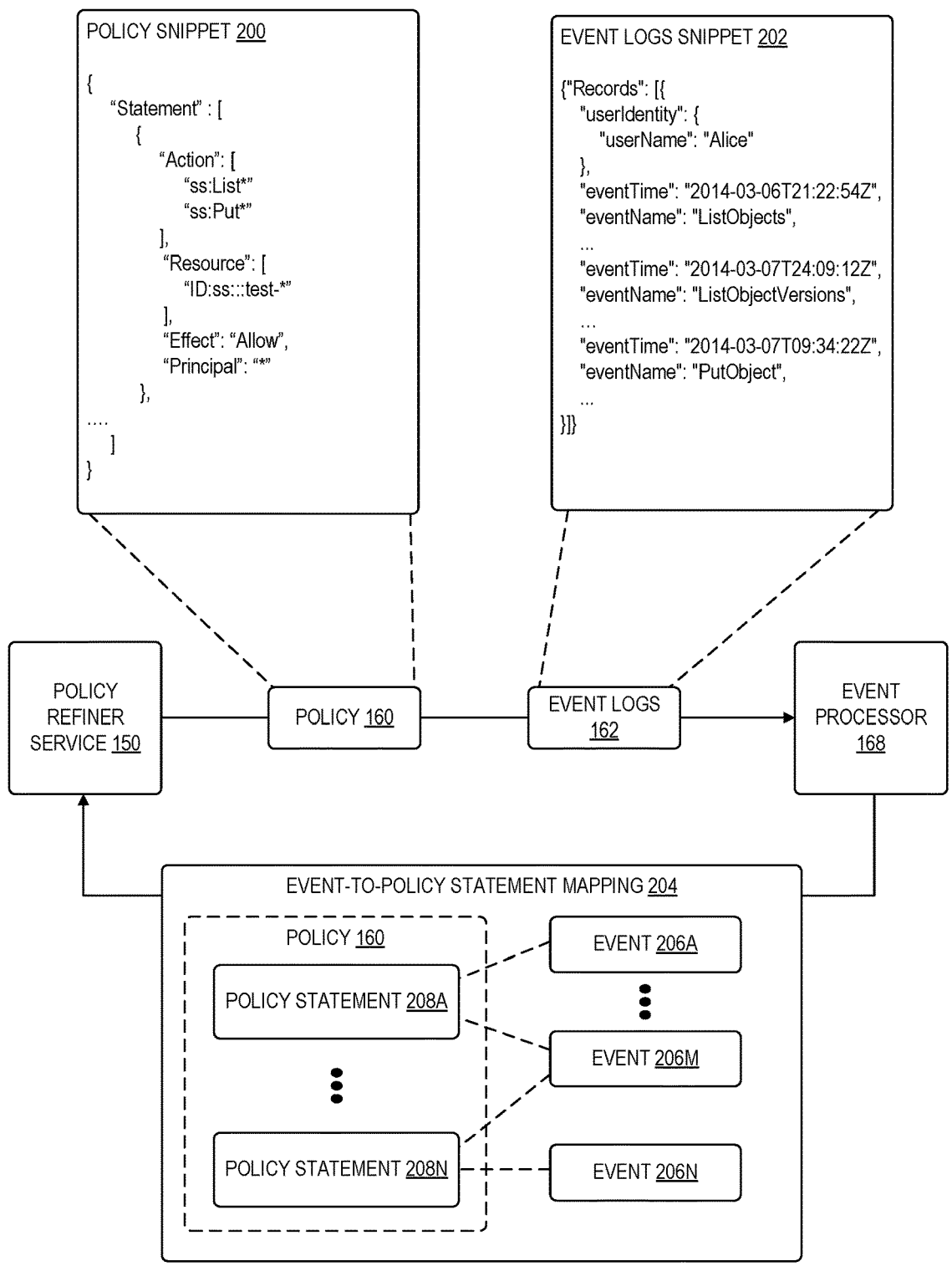
FIG. 2 is a diagram illustrating the use of an event processor to map events contained in event logs obtained from an account activity logging service to statements contained in a policy according to some examples.

FIG. 2 is a diagram illustrating the use of an event processor to map events contained in event logs obtained from an account activity logging service to statements contained in a policy according to some examples. As shown in FIG. 2, a policy refiner service 150 provides a policy 160 and event logs 162 to an event processor 168. The policy snippet 200, for example, shows a portion of the policy 160. In this example, the policy snippet 200 illustrates a policy statement indicating that one or more actions (e.g., actions that match the "ss:List*" and "ss:Put*" field values, e.g., any actions that begin with the strings "ss:List" or "ss:Put") are permitted to be performed relative one or more resources (e.g., identified by the resource identifier "ID:ss:::test-*", e.g., any resources with identifiers that begin with the string "ID:ss:::test-").

The example event logs snippet 202 shows a portion of the event logs 162, illustrating an event log entry corresponding to an action performed by a user "Alice". The event log shown in event logs snippet 202 indicates that the user Alice performed the actions named "ListObjects", "ListObjectVersions", and "PutObject" at various times. In this example, each of the actions is permitted by the statement illustrated in the policy snippet 200. Other event logs contained in the event logs 162 may represent other actions, possibly performed by other users, and which may be permitted by the same or different statements contained in the policy 160.

As shown, in some examples, the event processor 168 creates event-to-policy statement mapping 204 data identifying relationships between events in the event logs 162 and statements contained in the policy 160. In the example shown in FIG. 2, the event processor 168 determines that each of event 206A, . . . , event 206M is permitted by the policy statement 208A, while the event 206N is permitted by the policy statement 208N). As illustrated, in some examples, events can be permitted by two or more different policy statements contained in a policy 160 (e.g., event 206M is permitted based on a combination of policy statement 208A and policy statement 208N). The generated event-to-policy statement mapping 204 is provided back to the policy refiner service 150 for use in the analyses described hereinafter.

Figure 3:
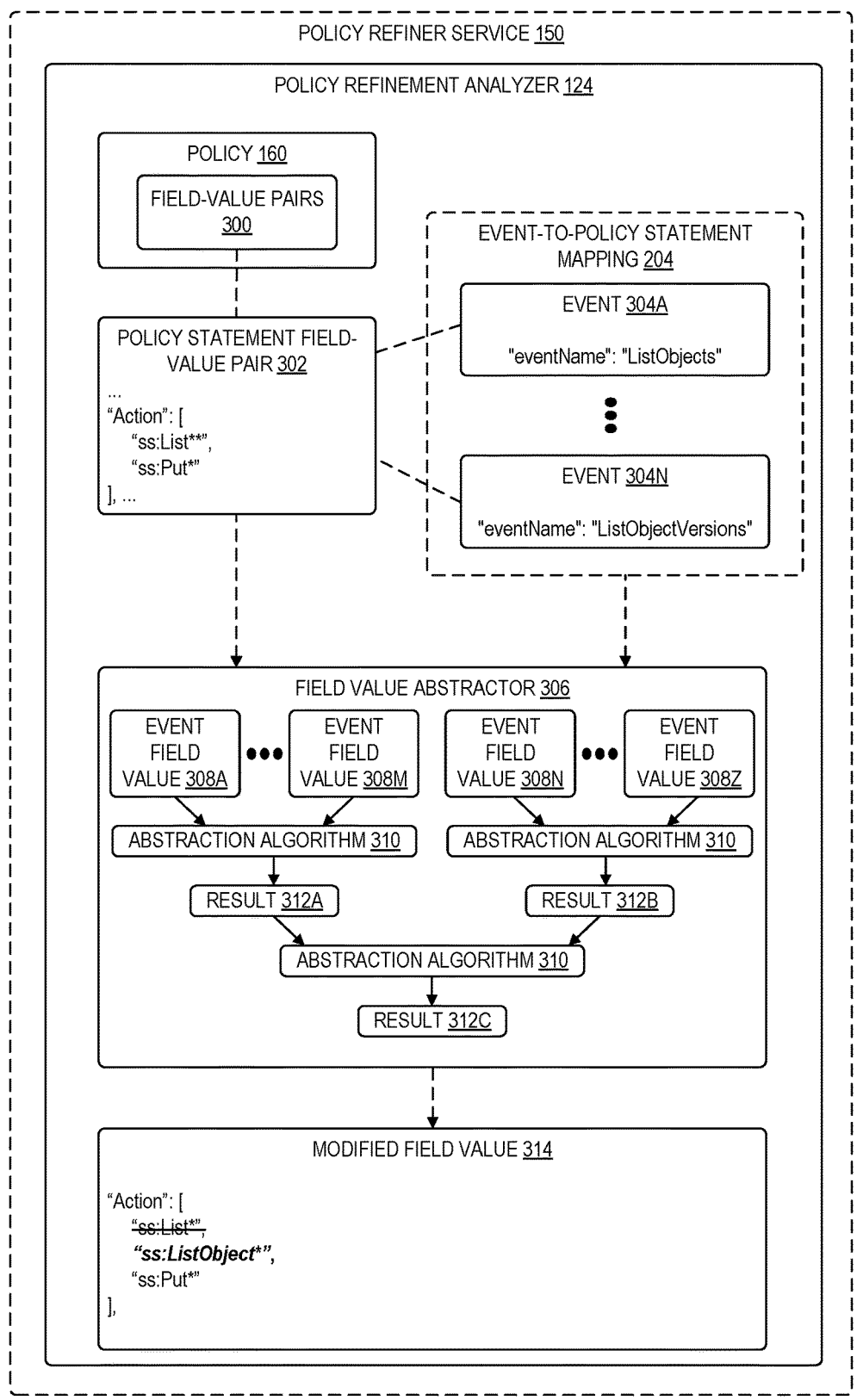
FIG. 3 is a diagram illustrating the example use of a policy refinement analyzer to generate policy refinement recommendations associated with statements of a policy according to some examples.

Returning again to FIG. 1, at circle "8," the policy refinement analyzer 124 analyzes the information generated by the event processor 168 and, at circle "9," generates one or more policy refinement recommendations 126 for the policy or policies under analysis. FIG. 3 is a diagram illustrating the example use of a policy refinement analyzer 124 to generate policy refinement recommendations associated with statements of a policy according to some examples. As shown, the policy refinement analyzer 124 begins with a policy 160, containing a collection of field-value pairs 300 (e.g., field-value pairs used to define actions, resources, conditions, or other components of the statements making up the policy 160) and the event-to-policy statement mapping 204 generated by the event processor 168. In the example shown in FIG. 3, the policy refinement analyzer 124 has further mapped field-value pairs from the events contained in the event-to-policy statement mapping 204 to corresponding field-value pairs 300 from the policy 160. For example, in FIG. 3, the policy refinement analyzer 125 has mapped field-value pairs from event 304A, . . . , event 304N corresponding to an action name (e.g., "ListObjects" and "ListObjectVersions") to a corresponding policy statement field-value pair 302 (e.g., indicating that actions starting with names "ss:List*" or "ss:Put*" are permitted).

In some examples, once the policy refinement analyzer 124 has identified a plurality of event values from the plurality of events corresponding to a particular field value from a statement of the policy 160, a field value abstractor 306 is used to generate a refined field value, where the refined field value may correspond to a value that causes the policy 160 to be more restrictive than the policy 160 with the original field value. In some examples, the field value abstractor 306 uses one or more field-specific abstraction algorithms to produce the modified field value 314 and is designed to ensure that the modified field value 314 is more restrictive than the original field value. For example, the field value abstractor 306 can implement one field-specific abstraction algorithm for action names, another field-specific abstraction algorithm for Internet Protocol (IP) addresses, and the like. In some examples, a particular field value within the policy analyzed by the field value abstractor 306 can include any of: a type of action the policy allows or denies, a resource to which the statement relates, a condition for granting the permission, or any other policy field.

In some examples, a field-value pair analyzed by the field value abstractor 306 can include a range of Internet Protocol (IP) addresses (e.g., specified as part of a policy condition restricting access to a resource to a limited range of IP addresses, or the like). In this example, a field-specific abstraction algorithm implemented by the field value abstractor 306 can generate a modified field value by determining a range of IP addresses that includes IP addresses contained in the plurality of events matched to the particular field. For example, the field value abstractor 306 can identify individual IP addresses associated with various events and determine a maximum range of IP addresses needed to include the IP addresses. The field value abstractor 306 can then determine whether the second range of IP addresses includes fewer IP addresses than the initial range of IP addresses (e.g., whether the second range of IP addresses is more restrictive than the range specified in the original policy) and, if so, can provide the second range of IP addresses as a modified field value.

As another example, if field-value pair under analysis identifies a first plurality of actions (e.g., the actions identified in the policy statement field-value pair 302), the field value abstractor 306 can implement a field-specific abstraction algorithm that generates the modified field value by identifying one or more second actions contained in the event-to-policy statement mapping 204 corresponding to the particular field (e.g., actions actually performed by one or more users that were permitted by the policy 160). The field value abstractor can then determine whether the one or more second actions is fewer than the originally listed set of actions and, if so, generate a modified field value by enumerating the one or more second actions, or by generating a more restrictive string identifier of multiple actions.

As yet another example, if the particular field value under analysis includes a first resource identifier identifying a plurality of resources, the field value abstractor 306 can implement a field-specific abstraction algorithm generates the modified field value by identifying a plurality of second resource identifiers contained in the plurality of events corresponding to the particular field. The field value abstractor 306 can then identify, using the plurality of second resource identifiers, a third resource identifier based on at least one of: a longest common prefix of the plurality of second resource identifiers, or a longest common suffix of the plurality of second resource identifiers and determine whether the third resource identifier is more restrictive than the first resource identifier. If so, the field value abstractor can use the third resource identifier as the modified field value.

In some examples, the performance of the field-specific abstraction algorithms is parallelizable across any number of independent computing resources (e.g., separate processing threads, VM instances, containers, servers, etc.). For example, the performance of the field-specific abstraction algorithms can be performed incrementally such that an algorithm (e.g., an abstraction algorithm 310) can be performed on a first subset of events (event field value 308A, . . . , event field value 308M) to obtain a result 312A and separately performed (e.g., using separate computing resources in parallel, or the same resources in sequence) on a second subset of events (event field values 308N, . . . , event field value 308Z) to obtain a result 312B. The abstraction algorithm 310 can then be performed on the results from these separate analyses to obtain a result 312C, and on so on as desired.

As indicated, in some examples, the policy refiner service 150 can determine, using a policy property analyzer 158, that the policy including the modified field value is more restrictive than the policy without the modified field value. As indicated, the policy property analyzer can use a Satisfiability Modulo Theories (SMT) solver and other techniques to determine that the policy including the modified field value is more restrictive than the policy without the modified field value.

Figure 4:
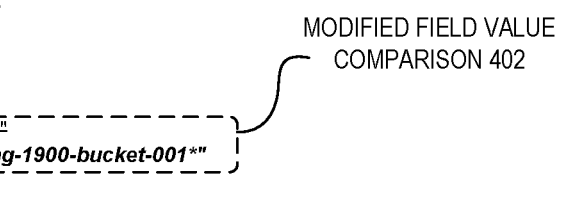
FIG. 4 is an example user interface displaying recommended modifications to a policy as generated by a policy refiner application according to some examples.

Returning to FIG. 1, at circle "10," the policy refiner service 150 generates a policy refinement report 170 identifying the one more suggested modifications generated by the policy refinement analyzer 124, or otherwise provides access to the one or more modified field values (e.g., to one or more downstream components that use the modified field values to perform other types of analyses). FIG. 4 is an example user interface displaying recommended modifications to a policy as generated by a policy refined application according to some examples. The report interface 400, for example, includes a policy refinement analysis report detailing information about the policy refinement process. As shown, the report can include information about differences between a user's original policy and the policy with one or more suggested modifications. The modified field value comparison 402, for example, shows a proposed edit to a field value identifying resources for which one or more actions are permitted. In this example, the modified field value comparison 402 indicates a change that lengthens a matching string used to identify permitted resources (e.g., because all event from the logs permitted by the corresponding statement included a resource identifier containing at least the modified string value), thereby further restricting the policy. The policy refinement recommendation can generally include proposed modifications to any number of field values in the policy. In other examples, instead of or in addition to generating a policy refinement report, the policy refiner service 150 can automatically implement one or more of the suggested modifications.

In some examples, a user can provide input requesting to accept a suggested modification to the policy 160 (e.g., by providing input to a report interface 400 requesting implementation of the change identified by the modified field value comparison 402). Responsive to such a request, the policy refiner service 150 stores, in association with the user's account, a modified version of the policy based on the modified field value(s). Subsequent requests associated with the user's account can be then by evaluated by the identity and access management service 114 using the modified policy.

Many of the examples described herein involve identifying, from logs of events, actions that were permitted based on statements included in a policy and refining policy statements permitting certain actions accordingly. Similar techniques can also be used to refine "deny" statements, i.e., statements that deny one or more types of actions based on conditions specified in a policy. For example, the policy refiner can obtain as input a set of events (e.g., provided as event logs or in any other format) that a user desires to be denied by a policy that the user is creating. In this example, the policy refiner can generate, using longest common prefix, longest common suffix, or other types of analyses, a deny policy statement that denies each of the events identified in the input. The policy refiner performs the refinement in a manner such that the deny statement denies the identified events but is not overly restrictive (e.g., it does not simply deny all events).

Figure 5:
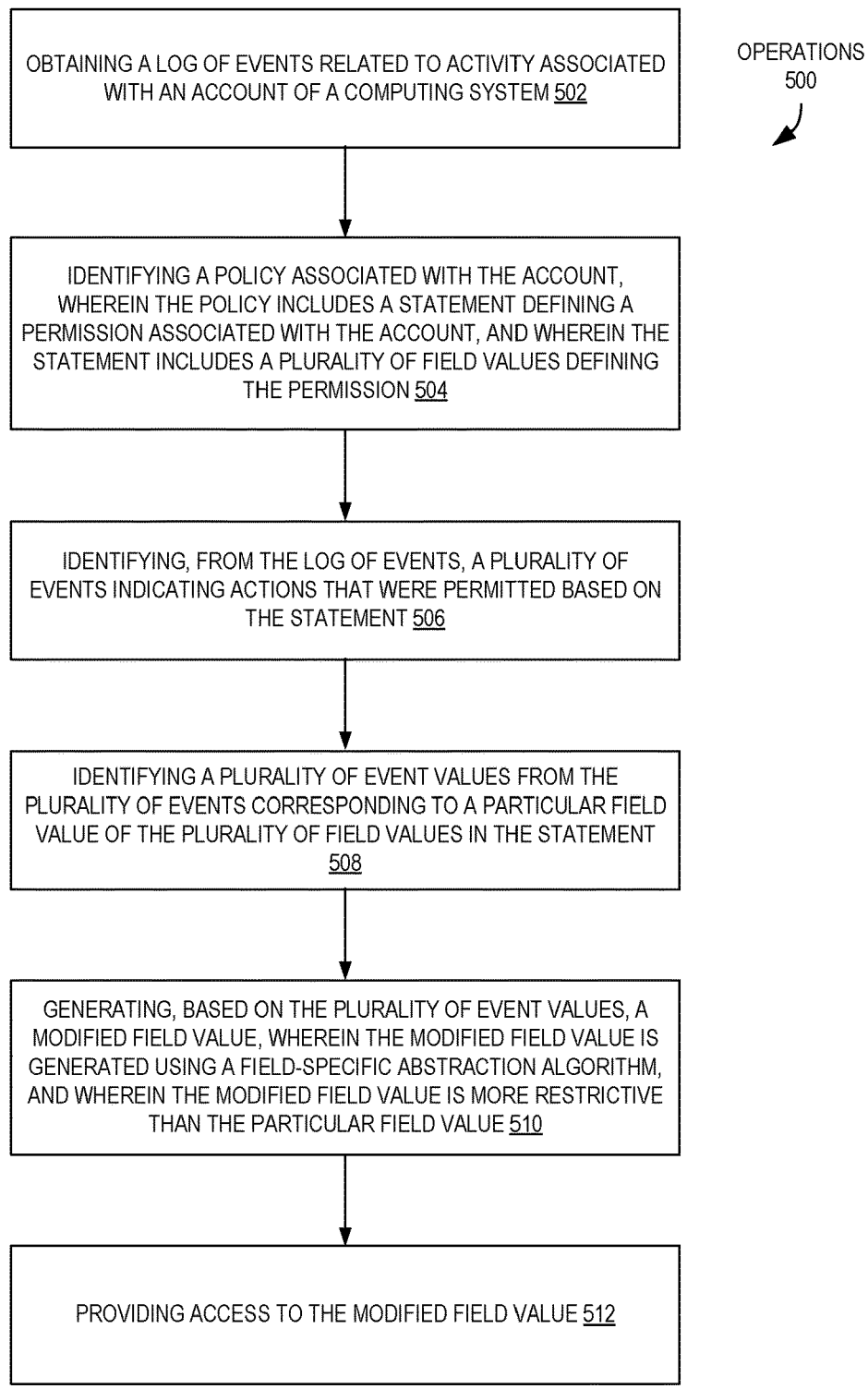
FIG. 5 is a flow diagram illustrating operations of a method for using a policy refiner application to analyze and recommend modifications to identity and access management policies created by users of a cloud provider network to reduce permissions granted by the policies according to some examples.

FIG. 5 is a flow diagram illustrating operations 500 of a method for using a policy refiner application to analyze and recommend modifications to identity and access management policies created by users of a cloud provider network to reduce permissions granted by the policies according to some examples. Some or all the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by a policy refiner service 150 of the other figures.

The operations 500 include, at block 502, obtaining a log of events related to activity associated with an account of a computing system.

The operations 500 further include, at block 504, identifying a policy associated with the account, wherein the policy includes a statement defining a permission associated with the account, and wherein the statement includes a plurality of field values defining the permission.

The operations 500 further include, at block 506, identifying, from the log of events, a plurality of events indicating actions that were permitted based on the statement.

The operations 500 further include, at block 508, identifying a plurality of event values from the plurality of events corresponding to a particular field value of the plurality of field values in the statement.

The operations 500 further include, at block 510, generating, based on the plurality of event values, a modified field value, wherein the modified field value is generated using a field-specific abstraction algorithm, and wherein the modified field value is more restrictive than the particular field value.

The operations 500 further include, at block 512, providing access to the modified field value. In some examples, providing access to the modified field value includes causing display of a suggested modification to the policy based on the modified field value.

In some examples, the operations further include invoking execution of the field-specific abstraction algorithm across two or more computing resources, wherein each of the two or more computing resources operates on a subset of the plurality of events; and combining results generated by the two or more computing resources to obtain the modified field value.

In some examples, the operations further include receiving input requesting to accept the suggested modification to the policy; and storing, in association with the account, a modified version of the policy based on the modified field value.

In some examples, the operations further include determining, using a policy property analyzer, that the policy including the modified field value is more restrictive than the policy without the modified field value, and wherein the policy property analyzer uses a Satisfiability Modulo Theories (SMT) solver to determine that the policy including the modified field value is more restrictive than the policy without the modified field value.

In some examples, the operations further include receiving a request to analyze the policy, wherein the request identifies at least one of: a time range of the log of events to obtain, or an indication of one or more user accounts to analyze; and wherein obtaining the log of events includes obtaining events within the time range or associated with the one or more user accounts.

In some examples, a particular field value of the plurality of field values identifies one of: a type of action the policy allows or denies, a resource to which the statement relates, or a condition for granting the permission.

In some examples, the particular field value of the plurality of field values identifies a first range of Internet Protocol (IP) addresses, and wherein the field-specific abstraction algorithm generates the modified field value by: determining a second range of IP addresses that includes IP addresses contained in the plurality of events corresponding to the particular field; determining that the second range of IP addresses includes fewer IP addresses than the first range of IP addresses; and using the second range of IP addresses as the modified field value.

In some examples, the particular field value of the plurality of field values identifies a first plurality of actions, and wherein the field-specific abstraction algorithm generates the modified field value by: identifying one or more second actions contained in the plurality of events corresponding to the particular field; determining that the one or more second actions is fewer than the first plurality of actions; and generating the modified field value by enumerating the one or more second actions.

In some examples, the particular field value of the plurality of field values is a first resource identifier identifying a plurality of resources, and wherein the field-specific abstraction algorithm generates the modified field value by: identifying a plurality of second resource identifiers contained in the plurality of events corresponding to the particular field; identifying, using the plurality of second resource identifiers, a third resource identifier based on at least one of: a longest common prefix of the plurality of second resource identifiers, or a longest common suffix of the plurality of second resource identifiers; and determining that the third resource identifier is more restrictive than the first resource identifier; and using the third resource identifier as the modified field value.

In some examples, the operations further include obtaining, using a policy property analyzer, an identifier of action that is permitted by the policy without the modified field value but is not permitted by the policy with the modified field value, wherein the policy property analyzer uses a Satisfiability Modulo Theories (SMT) solver to determine that the action is permitted by the policy without the modified field value but is not permitted by the policy with the modified field value; and causing display of the identifier of the action.

In some examples, the suggested modification to the policy is displayed in a graphical user interface (GUI) displaying differences between the policy with the particular field value and the policy with the modified field value.

Figure 6:
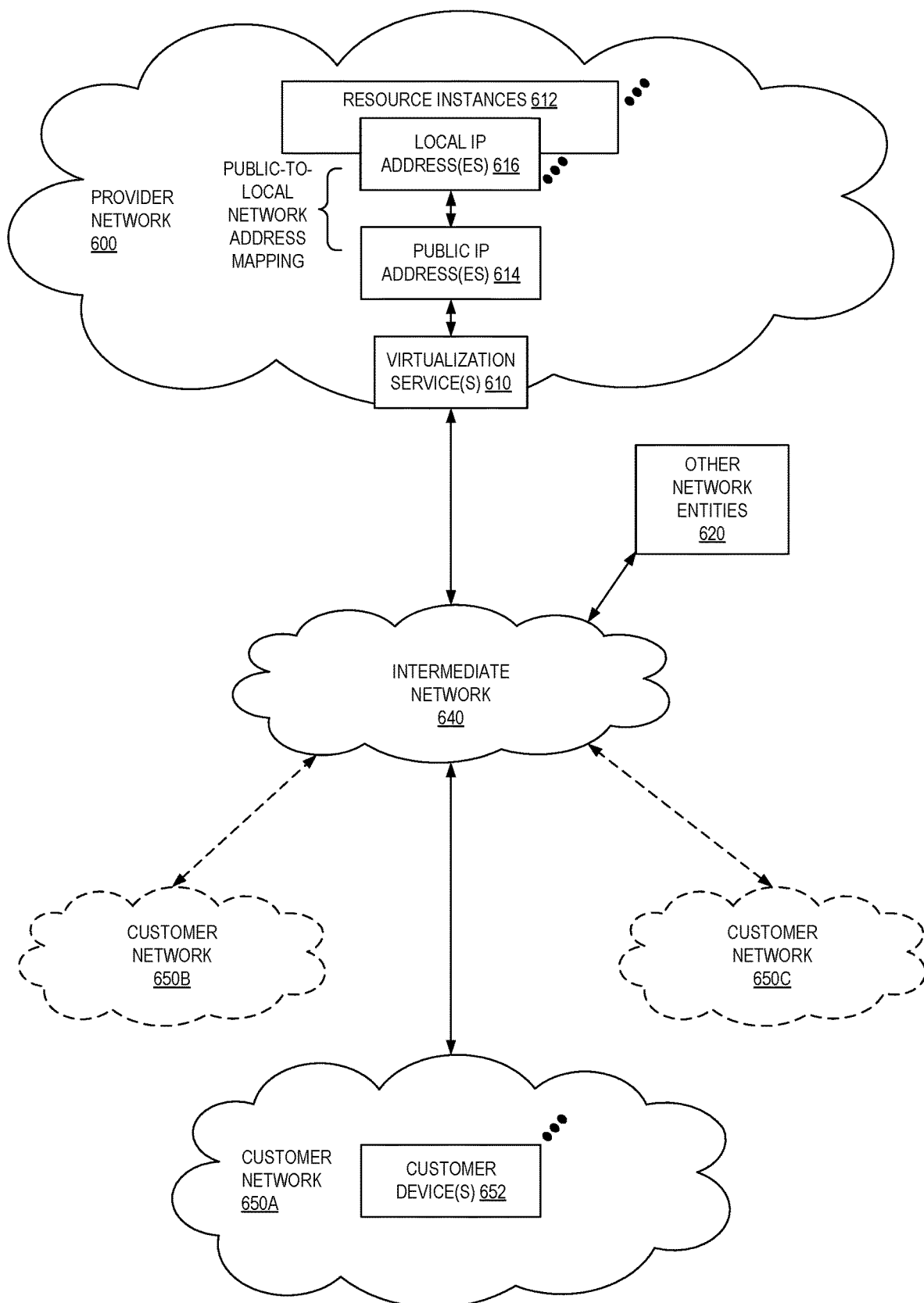
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
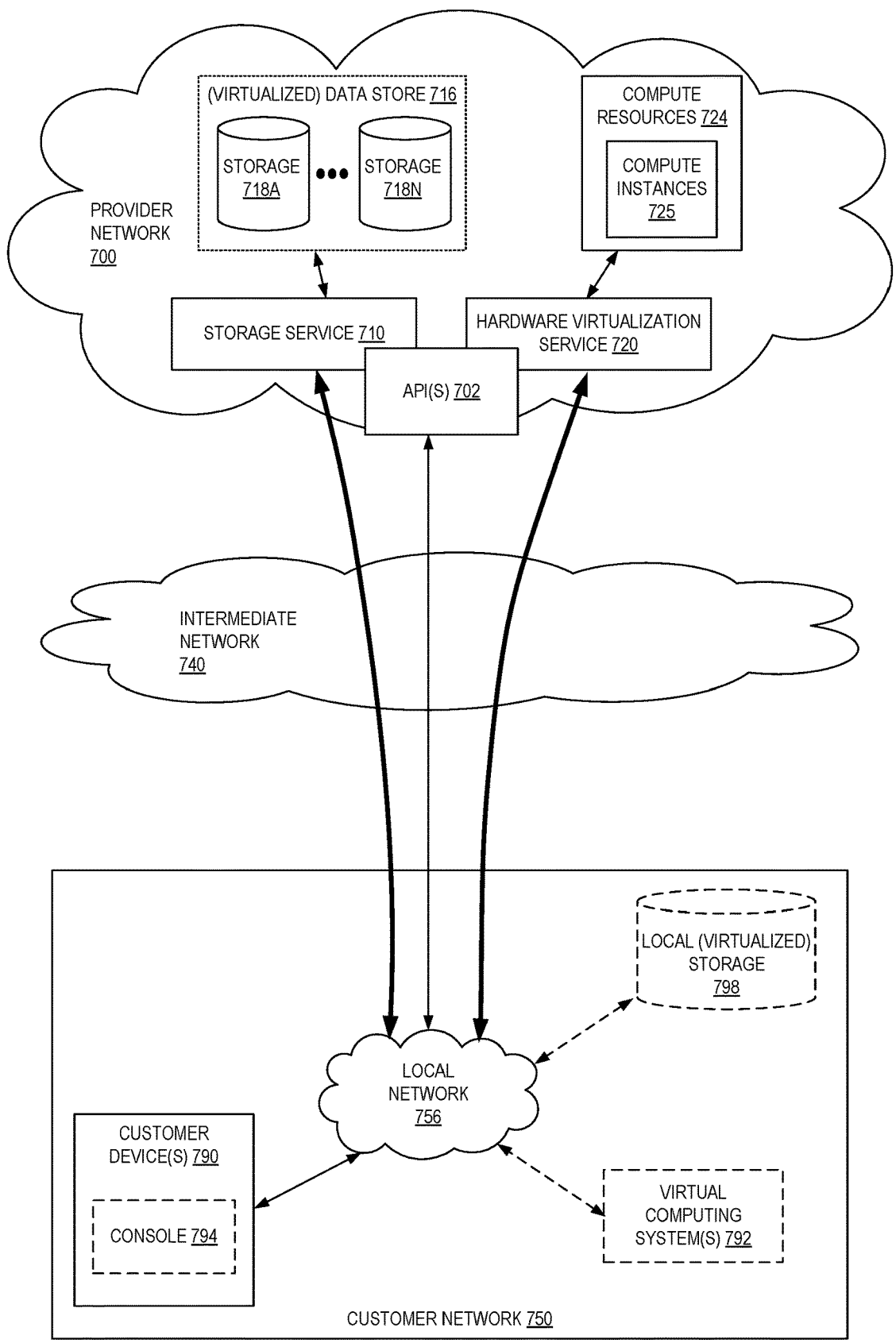
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
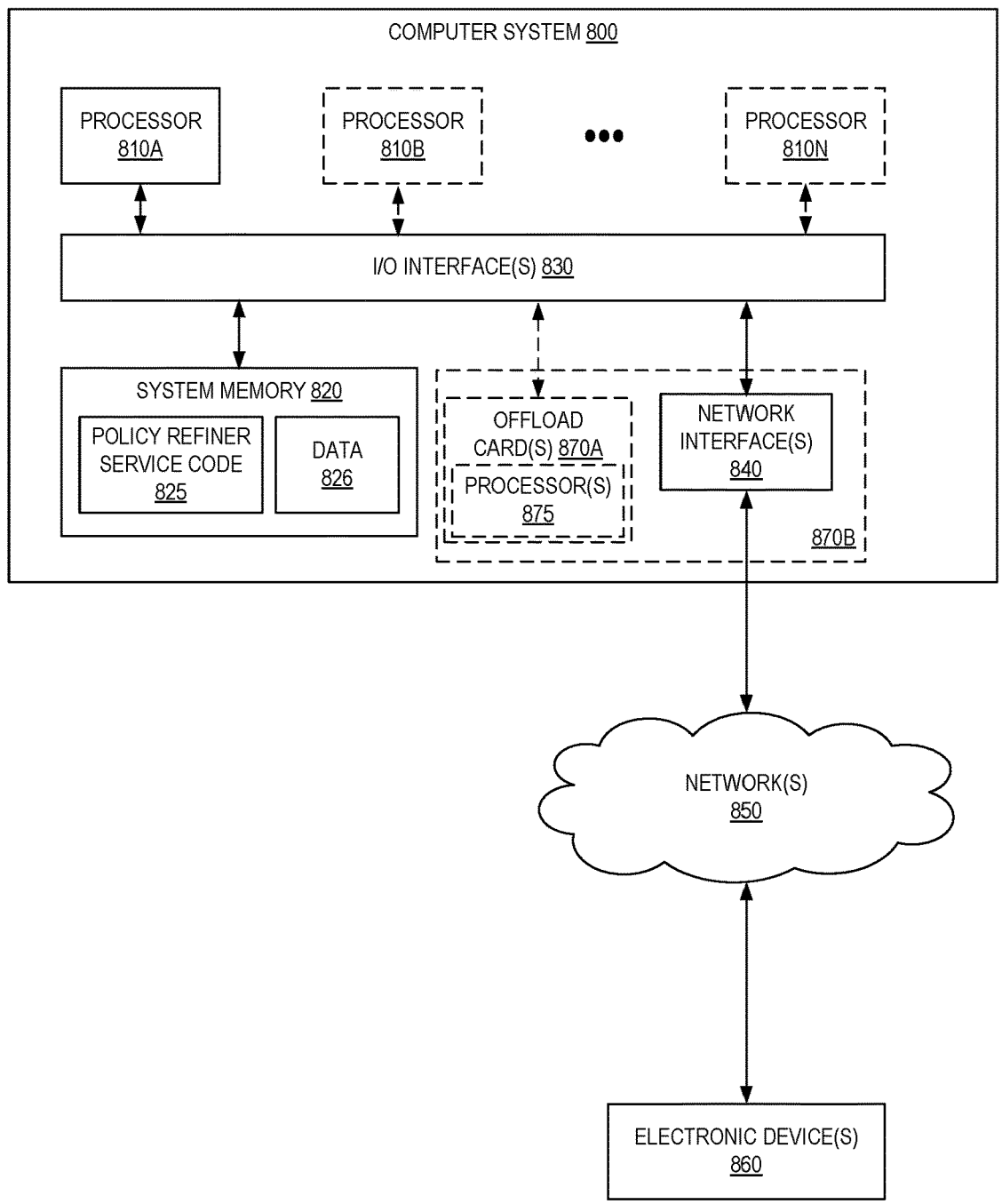
FIG. 8 is a block diagram illustrating an example computer system that can be used in some examples.

In some examples, a system that implements a portion or all of the techniques described herein can include a general-purpose computer system, such as the computer system 800 illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as policy refiner service code 825 (e.g., executable to implement, in whole or in part, the policy refiner service 150) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and can not coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    obtaining, by a policy refiner service of a cloud provider network, a log of events related to activity associated with an account of the cloud provider network, wherein an event in the log of events indicates an action performed relative to a resource of the cloud provider network;

identifying a policy associated with the account, wherein the policy includes a statement defining a permission associated with the account, wherein the statement includes a plurality of field values defining the permission, and wherein a particular field value of the plurality of field values identifies one of: a type of action the policy allows or denies, a resource to which the statement relates, or a condition for granting the permission;

identifying, from the log of events, a plurality of events indicating actions that were permitted based on the statement by parsing the plurality of events from the log of events and mapping individual events from the log of events to the statement from the policy that caused an identity and access management service to permit requests represented by the individual events;

identifying a plurality of event values from the plurality of events corresponding to the particular field value in the statement;

generating, based on the plurality of event values, a modified field value, wherein the modified field value is generated using a field-specific abstraction algorithm, and wherein the modified field value is more restrictive than the particular field value;

determining, using a policy property analyzer, that a modified policy including the modified field value is more restrictive than the policy with the particular field value, wherein the policy property analyzer uses a Satisfiability Modulo Theories (SMT) solver to determine that the modified policy including the modified field value is more restrictive than the policy with the particular field value; and causing display of a suggested modification to the policy based on the modified field value, wherein the suggested modification to the policy would result in the modified policy including the modified field value.

2. The computer-implemented method of claim 1, further comprising:
invoking execution of the field-specific abstraction algorithm across two or more computing resources, wherein each of the two or more computing resources operates on a subset of the plurality of events; and
combining results generated by the two or more computing resources to obtain the modified field value.

3. The computer-implemented method of claim 1, further comprising:
receiving input requesting to accept the suggested modification to the policy; and
storing, in association with the account, a modified version of the policy including the modified field value.

4. A computer-implemented method comprising:
obtaining a log of events related to activity associated with an account of a computing system;
identifying a policy associated with the account, wherein the policy includes a statement defining a permission associated with the account, and wherein the statement includes a plurality of field values defining the permission;
identifying, from the log of events, a plurality of events indicating actions that were permitted based on the statement by parsing the plurality of events from the log of events and mapping individual events from the log of events to the statement from the policy that caused an identity and access management service to permit requests represented by the individual events;
identifying a plurality of event values from the plurality of events corresponding to a particular field value of the plurality of field values in the statement;

generating, based on the plurality of event values, a modified field value, wherein the modified field value is generated using a field-specific abstraction algorithm, and wherein the modified field value is more restrictive than the particular field value;

determining, using a policy property analyzer, that a modified policy including the modified field value is more restrictive than the policy with the particular field value, wherein the policy property analyzer uses a Satisfiability Modulo Theories (SMT) solver to determine that the modified policy including the modified field value is more restrictive than the policy with the particular field value; and causing display of a suggested modification to the policy based on the modified field value, wherein the suggested modification to the policy would result in the modified policy including the modified field value.

5. The computer-implemented method of claim 4, further comprising:
invoking execution of the field-specific abstraction algorithm across two or more computing resources, wherein each of the two or more computing resources operates on a subset of the plurality of events; and
combining results generated by the two or more computing resources to obtain the modified field value.

6. The computer-implemented method of claim 4, further comprising:
receiving input requesting to accept the suggested modification to the policy; and
storing, in association with the account, a modified version of the policy including the modified field value.

7. The computer-implemented method of claim 4, further comprising:
receiving a request to analyze the policy, wherein the request identifies a time range of the log of events to obtain; and
wherein obtaining the log of events includes obtaining events within the time range.

8. The computer-implemented method of claim 4, wherein a particular field value of the plurality of field values identifies one of: a type of action the policy allows or denies, a resource to which the statement relates, or a condition for granting the permission.

9. The computer-implemented method of claim 4, wherein the particular field value of the plurality of field values identifies a first range of Internet Protocol (IP) addresses, and wherein the field-specific abstraction algorithm generates the modified field value by:
determining a second range of IP addresses that includes IP addresses contained in the plurality of events corresponding to the particular field value;
determining that the second range of IP addresses includes fewer IP addresses than the first range of IP addresses; and
using the second range of IP addresses as the modified field value.

10. The computer-implemented method of claim 4, wherein the particular field value of the plurality of field values identifies a first plurality of actions, and wherein the field-specific abstraction algorithm generates the modified field value by:
identifying one or more second actions contained in the plurality of events corresponding to the particular field value;
determining that the one or more second actions is fewer than the first plurality of actions; and generating the modified field value by enumerating the one or more second actions in the modified field value.

11. The computer-implemented method of claim 4, wherein the particular field value of the plurality of field values is a first resource identifier identifying a plurality of resources, and wherein the field-specific abstraction algorithm generates the modified field value by:
identifying a plurality of second resource identifiers contained in the plurality of events corresponding to the particular field value;
identifying, using the plurality of second resource identifiers, a third resource identifier based on at least one of: a longest common prefix of the plurality of second resource identifiers, or a longest common suffix of the plurality of second resource identifiers;
determining that the third resource identifier is more restrictive than the first resource identifier; and
using the third resource identifier as the modified field value.

12. The computer-implemented method of claim 4, further comprising:
obtaining, using the policy property analyzer, an identifier of an action that is permitted by the policy without the modified field value but is not permitted by the modified policy including the modified field value, wherein the policy property analyzer uses the SMT solver to determine that the action is permitted by the policy without the modified field value but is not permitted by the modified policy including the modified field value; and
causing display of the identifier of the action.

13. The computer-implemented method of claim 4, wherein the suggested modification to the policy is displayed in a graphical user interface (GUI) displaying differences between the policy with the particular field value and the modified policy including the modified field value.

14. A system comprising:
a first one or more electronic devices to implement a policy refiner service in a cloud provider network, wherein the policy refiner service includes instructions that upon execution cause the policy refiner service to:
obtain, from an account activity logging service of the cloud provider network, a log of events related to activity associated with an account of a computing system;
identify a policy associated with the account, wherein the policy includes a statement defining a permission associated with the account, and wherein the statement includes a plurality of field values defining the permission;
identify, from the log of events, a plurality of events indicating actions that were permitted based on the statement by parsing the plurality of events from the log of events and mapping individual events from the log of events to the statement from the policy that caused an identity and access management service to permit requests represented by the individual events;
identify a plurality of event values from the plurality of events corresponding to a particular field value of the plurality of field values in the statement;
generate, based on the plurality of event values, a modified field value, wherein the modified field value is generated using a field-specific abstraction algorithm, and wherein the modified field value is more restrictive than the particular field value;
determine, using a policy property analyzer, that a modified policy including the modified field value is more restrictive than the policy with the particular field value, wherein the policy property analyzer uses a Satisfiability Modulo Theories (SMT) solver to determine that the modified policy including the modified field value is more restrictive than the policy with the particular field value; and
cause display of a suggested modification to the policy based on the modified field value, wherein the suggested modification to the policy would result in the modified policy including the modified field value; and
a second one or more electronic devices to implement the account activity logging service in the cloud provider network, the account activity logging service including instructions that upon execution cause the account activity logging service to:
generate the log of events related to activity associated with an account of the cloud provider network; and
provide the log of events to the policy refiner service.

15. The system of claim 14, wherein the policy refiner service further includes instructions that upon execution cause the policy refiner service to:
invoke execution of the field-specific abstraction algorithm across two or more computing resources, wherein each of the two or more computing resources operates on a subset of the plurality of events; and
combine results generated by the two or more computing resources to obtain the modified field value.

16. The system of claim 14, wherein the policy refiner service further includes instructions that upon execution cause the policy refiner service to:
receive input requesting to accept the suggested modification to the policy; and
store, in association with the account, a modified version of the policy including the modified field value.

17. The system of claim 14, wherein the policy refiner service further includes instructions that upon execution cause the policy refiner service to:
receive a request to analyze the policy, wherein the request identifies at least one of: a time range of the log of events to obtain, or an indication of one or more user accounts to analyze: and
wherein obtaining the log of events includes obtaining events within the time range or associated with the one or more user accounts.

18. The system of claim 14, wherein a particular field value of the plurality of field values identifies one of: a type of action the policy allows or denies, a resource to which the statement relates, or a condition for granting the permission.

19. The system of claim 14, wherein the particular field value of the plurality of field values identifies a first range of Internet Protocol (IP) addresses, and wherein the field-specific abstraction algorithm generates the modified field value by:
determining a second range of IP addresses that includes IP addresses contained in the plurality of events corresponding to the particular field value;
determining that the second range of IP addresses includes fewer IP addresses than the first range of IP addresses; and
using the second range of IP addresses as the modified field value.

20. The system of claim 14, wherein the particular field value of the plurality of field values identifies a first plurality of actions, and wherein the field-specific abstraction algorithm generates the modified field value by:

identifying one or more second actions contained in the plurality of events corresponding to the particular field value;
determining that the one or more second actions is fewer than the first plurality of actions; and
generating the modified field value by enumerating the one or more second actions in the modified field value.

\* \* \* \* \*